(12) United States Patent
Chancel et al.

(10) Patent No.: US 7,890,736 B2
(45) Date of Patent: Feb. 15, 2011

(54) CONTROL DEVICE WITH FLAG REGISTERS FOR SYNCHRONIZATION OF COMMUNICATIONS BETWEEN CORES

(75) Inventors: Francois Chancel, Cannes (FR); Patrick Fulcheri, Valbonne (FR)

(73) Assignee: ST-Ericsson SA, Geneva (CH)

( * ) Notice: Subject to any disclaimer, the term of this patent is extended or adjusted under 35 U.S.C. 154(b) by 481 days.

(21) Appl. No.: 12/092,615

(22) PCT Filed: Nov. 3, 2006

(86) PCT No.: PCT/IB2006/054104

§ 371 (c)(1),
(2), (4) Date: May 5, 2008

(87) PCT Pub. No.: WO2007/054871

PCT Pub. Date: May 18, 2007

(65) Prior Publication Data

US 2008/0294876 A1 Nov. 27, 2008

(30) Foreign Application Priority Data

Nov. 8, 2005 (EP) .................................. 05300900

(51) Int. Cl.
*G06F 7/38* (2006.01)
*G06F 9/00* (2006.01)
*G06F 9/44* (2006.01)
*G06F 15/00* (2006.01)

(52) U.S. Cl. ..................................................... 712/220
(58) Field of Classification Search ................... 712/220
See application file for complete search history.

(56) References Cited

U.S. PATENT DOCUMENTS

| | | | | |
|---|---|---|---|---|
| 4,594,657 A | | 6/1986 | Byrnes | |
| 5,611,053 A | * | 3/1997 | Wu et al. | 710/100 |
| 5,649,125 A | * | 7/1997 | Tietjen et al. | 710/305 |
| 5,951,659 A | * | 9/1999 | McElroy et al. | 710/300 |
| 6,823,441 B1 | * | 11/2004 | Ward et al. | 711/211 |
| 6,907,503 B2 | | 6/2005 | Lindsay et al. | |

* cited by examiner

*Primary Examiner*—Eddie P Chan
*Assistant Examiner*—Corey Faherty
(74) *Attorney, Agent, or Firm*—William J. Kubida; Hogan Lovells US LLP

(57) ABSTRACT

A control device (D) is a part of an integrated circuit (IC) comprising at least two cores (C1, C2) coupled, via buses (BC1, BC2), to a memory (M) arranged to store data to be transferred between these cores (C1, C2). This control device (D) comprises at least one flag register (FR1, FR2) coupled to the cores (C1, C2) via the buses (BC1, BC2) and arranged to store, at Ni addresses, Ni flag values associated to data stored into the memory (M) by one of the cores and ready to be transferred towards the other core, each flag value stored at a first address being able to be set or reset by one of the cores (C1, C2) by means of a command designating the first address, thus authorizing another flag value stored at a second address to be simultaneously set or reset by the other core (C2, C1) by means of a command designating the second address.

9 Claims, 3 Drawing Sheets

CONTROL DEVICE WITH FLAG REGISTERS FOR SYNCHRONIZATION OF COMMUNICATIONS BETWEEN CORES

The present invention relates to integrated circuits, and more precisely to synchronization of communications between cores (or processors) of such integrated circuits.

Inside most of complex integrated circuits, the firmware is distributed over several cores (or processors). This is notably the case in the integrated circuits of the baseband devices which are used into communication equipments such as mobile phones.

Frequently, a main core or processor, called CPU (Control Process Unit), is dedicated to a system control and one or more specialized cores or processors, called DSP (Digital Signal Processor), are dedicated to specific digital data processing, such as audio processing, video decoding, or communication channel coding.

Figure 1:
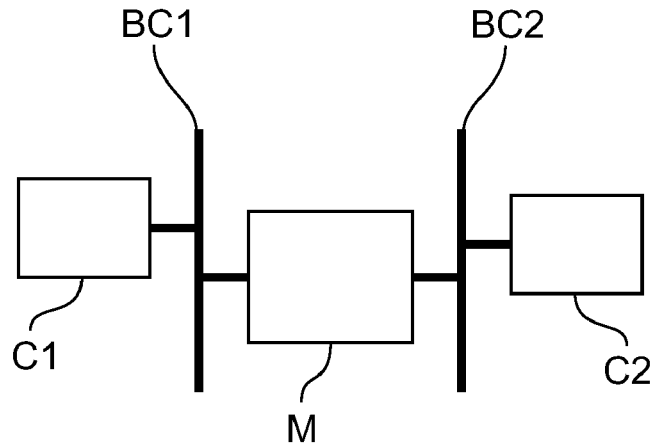

As it is illustrated in FIG. 1, to allow real-time dual communications (i.e. data transfer) between two cores C1 and C2, it has been proposed to connect a DPRAM memory (Dual-Port Random Access Memory) M to the data and address buses of each of these cores. It is recalled that this type of memory is a volatile memory which has generally a 16 or 32 bit width and can be accessed by two cores (or processors) at the same time. With such an arrangement (illustrated in FIG. 1), the two cores C1 and C2 see the DPRAM memory M as a classical memory and can read or write words at anyone of its addresses. The only restriction is that one of the cores cannot access a DPRAM memory storing area when the other core is writing data in this DPRAM memory storing area.

As it is known by one skilled in the art, the general way to synchronize two cores C1 and C2 through a classical DPRAM memory M is to use flags. It is recall that a flag is a binary value which is stored at an address inside the DPRAM memory M. A flag aims at signalling to a first core (C1 or C2) that a second core (C2 or C1) has completed an operation or a task (for instance the encoding of speech data) and that data, resulting from the operation or task, have been stored into a part DS of the DPRAM memory M by this second core and can be transferred into the first core. Each flag is used in only one direction between cores for instance the core C1 polls a flag waiting for its value to change (from 0 to 1), while the core C2 changes the value of this flag (from 0 to 1) when it has completed the operation corresponding to this flag.

Figure 2:
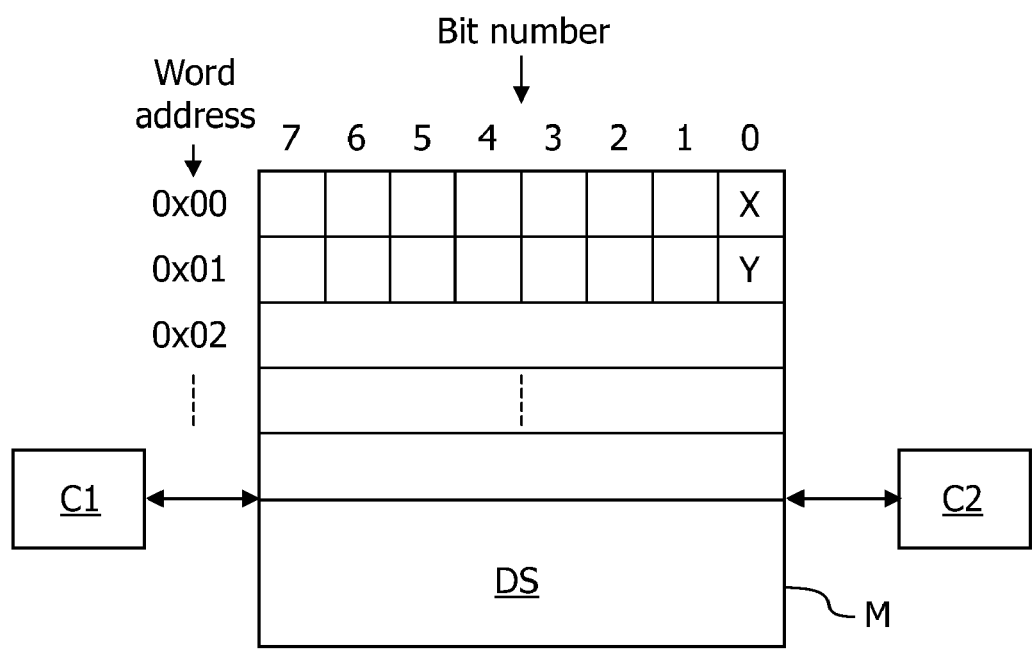

Due to the above-mentioned DPRAM access restriction, the different flags cannot be stored in a same DPRAM word at a chosen address, as it is illustrated in FIG. 2. Indeed, if we suppose that two flags X and Y are stored in a same DPRAM word at a chosen address, with values both set to zero (0), when the core C1 sets flag X to one (1) and the core C2 checks the value of flag X, the core C2 has to reset flag X (from 1 to 0) and can lose flag Y if the core C1 sets flag Y while the core C2 is resetting flag X. Moreover, the value of every flag in the word would become uncertain when both cores C1 and C2 write in the same time. So, it is necessary to store only one flag per word and then per address, which is costly in terms of memory size, especially when the DPRAM memory has a 32 bit width (for instance for 128 flags of one bit one loses 496 bits (128×31)).

So, the object of this invention is to improve the situation, and more precisely to propose an easy way for synchronizing the communications between two cores via a memory, for instance of the DPRAM type, without spoiling a huge quantity of memory size.

For this purpose, the invention provides a control device, for an integrated circuit comprising at least two cores coupled, via buses, to a memory arranged to store data to be transferred between these cores. This control device is characterized in that it comprises at least one flag register coupled to the cores via their buses and arranged to store (at Ni addresses) Ni flag values associated to data stored into the memory by one of the cores and ready to be transferred towards the other core. Each flag value stored at a first address can be set or reset by one of the cores by means of a command (or instruction) designating this first address, thus authorizing another flag value stored at a second address to be simultaneously set or reset by the other core by means of a command (or instruction) designating this second address.

The control device according to the invention may include additional characteristics considered separately or combined, and notably:

- it may comprise i) at least one first flag register coupled to the buses and arranged to store, at N1 addresses, N1 flag values associated to data stored into the memory by a first one of the cores and ready to be transferred towards a second one of these cores, each flag value stored at a first address of the first register being able to be set by the first core and reset by the second core by means of a command designating this first address, and ii) at least one second flag register coupled to the buses and arranged to store, at N2 addresses, N2 flag values associated to data stored into the memory by the second core and ready to be transferred towards the first core, each flag value stored at a first address of the second register being able to be set by the second core and reset by the first core by means of a command designating this first address;
- each flag register may comprise i) a first control means comprising a first input, connected to the bus which is connected to the first core, Ni first outputs, and a first flag value reading and writing means, ii) a second control means comprising a second input, connected to the bus which is connected to the second core, Ni second outputs, and a second flag value reading and writing means, and iii) a storing means comprising Ni storing areas having Ni respective addresses, arranged to store respectively Ni flag values, and connected respectively to one of the first outputs and one of the second outputs;
- each of the first and second control means may be arranged to set and/or reset several flag values stored into several storing areas of the storing means, each time it receives a single command designating the respective addresses of these several storing areas;
- it may comprise the memory, which may be a DRPAM memory or a RAM memory, for instance.

The invention also provides an integrated circuit, for an electronic equipment, comprising a control device such as the one above introduced.

The invention also provides an electronic equipment comprising an integrated circuit such as the one above introduced. This electronic equipment may be a computer (personal computer or laptop), a telephone (mobile phone, cordless phone or fixed telephone), a personal digital assistant (or PDA) or a music player (for instance a MP3 player).

Figure 3:
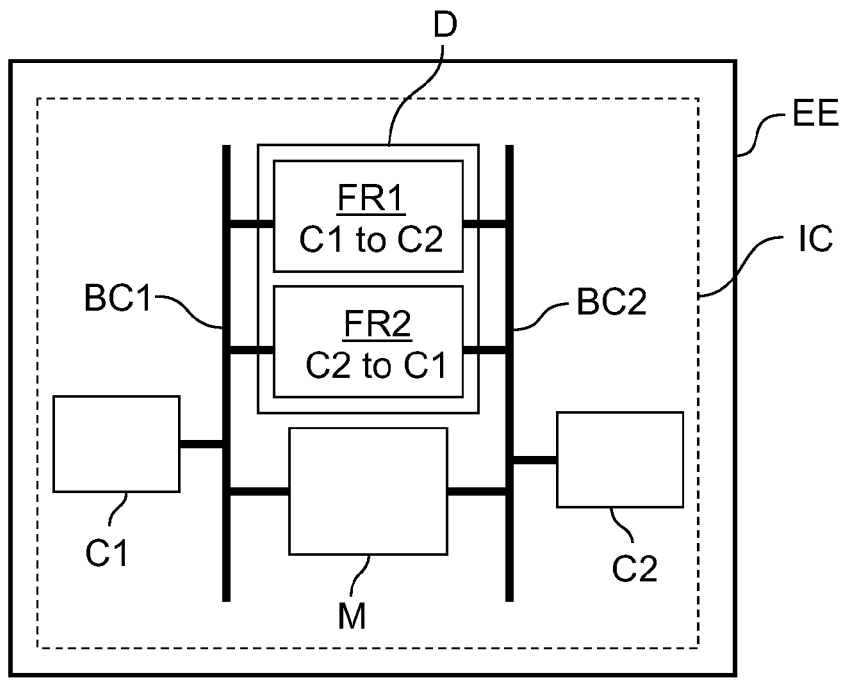
Figure 4:
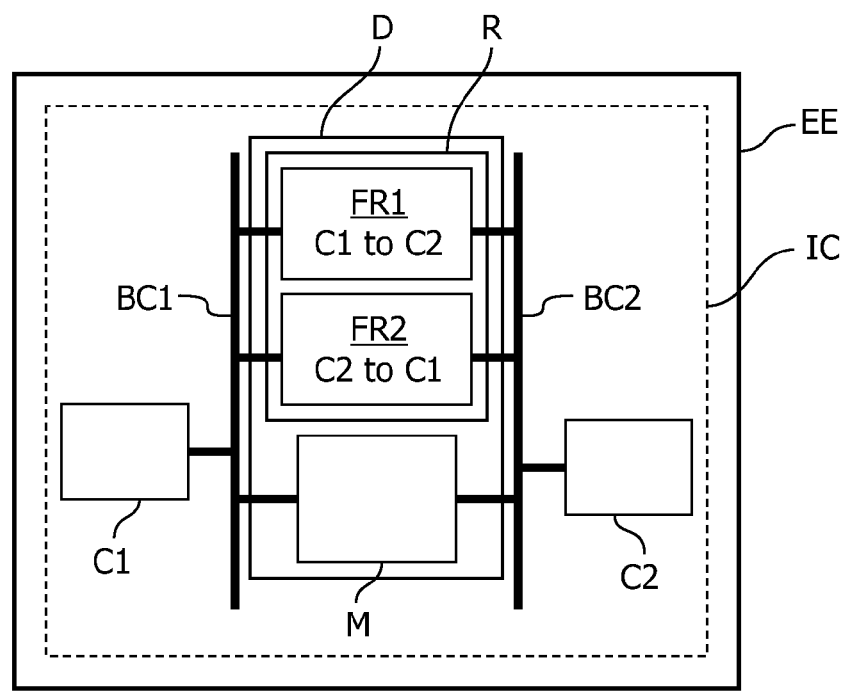
Figure 5:
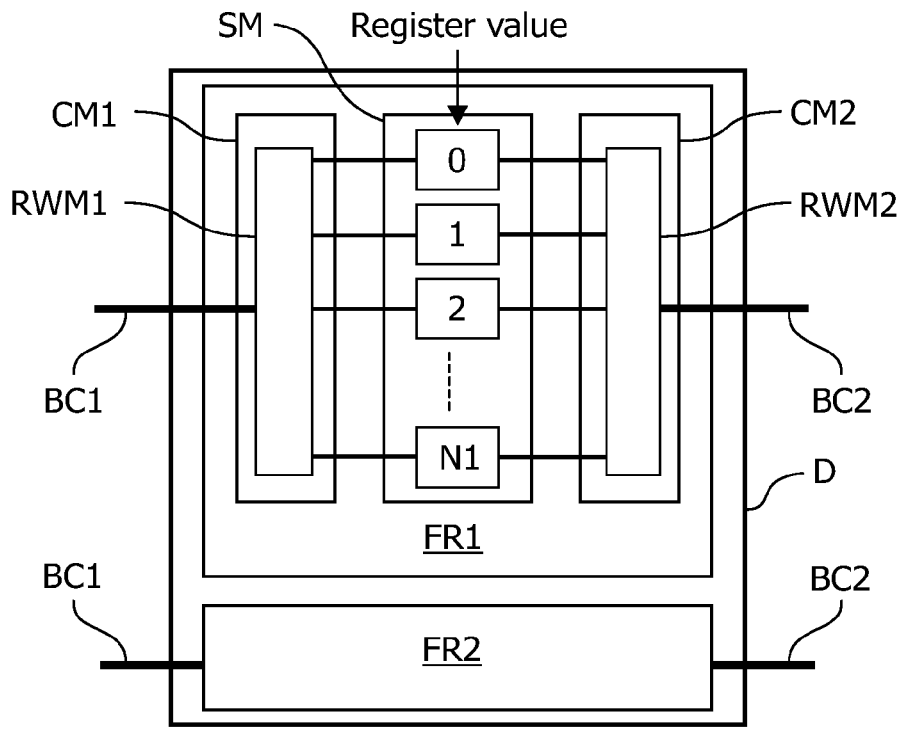
Figure 6:
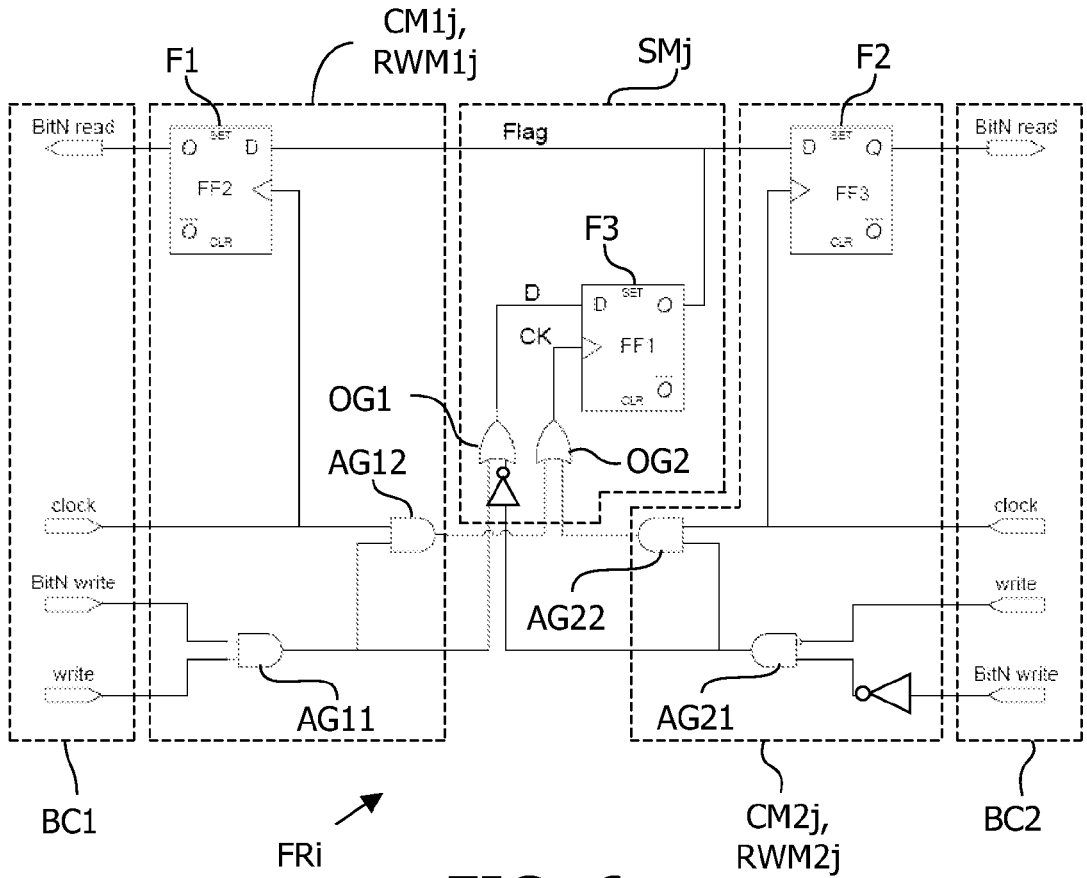

Other features and advantages of the invention will become apparent on examining the detailed specifications hereafter and the appended drawings, wherein:

FIG. 1 schematically illustrates a part of a prior art integrated circuit in which two cores are coupled to a common DPRAM memory, FIG. 2 schematically illustrates a DPRAM memory and the way flags are stored inside this one, FIG. 3 schematically illustrates a part of an integrated circuit in which two cores are coupled to a memory and to a first example of a control device according to the invention, FIG. 4 schematically illustrates a part of an integrated circuit in which two cores are coupled to a second example of a control device according to the invention, FIG. 5 functionally illustrates an example of embodiment of a flag register of the control device illustrated in FIG. 3, and FIG. 6 schematically illustrates an example of embodiment of a part of a flag register dedicated to the process of a single bit flag value.

The appended drawings may not only serve to complete the invention, but also to contribute to its definition, if need be.

Reference is initially made to FIG. 3 to describe a non-limiting (first) example of embodiment of a control device D according to the invention. This control device D constitutes a part of an integrated circuit IC, which can be installed into in an electronic equipment EE.

In the following description it will be considered that the electronic equipment EE is a mobile phone. But the integrated circuit IC according to the invention may be installed in any electronic equipment in which a firmware needs to be distributed over several cores (or processors). So, it could be a computer (personal computer or laptop), a cordless phone, a fixed telephone, a personal digital assistant (or PDA) or a music player (for instance a MP3 player), for instance.

As mentioned before, the control device D according to the invention aims at synchronizing the dual communications between two cores C1 and C2 of an integrated circuit IC, via a common memory M.

In the following description it will be considered that the common memory M is a DPRAM memory (Dual-Port Random Access Memory) which is connected to first BC1 and second BC2 (address and data) buses respectively connected to the first C1 and second C2 cores. But the invention is not limited to this type of memory. It applies to any memory which can be accessed by two cores by means of a common multilayer bus. So, the common memory M could be also a Random Access Memory (or RAM).

Moreover, in the following description it will be considered that the first core C1 is a main processor, also called CPU (Control Process Unit) and dedicated to the control of the mobile phone EE, and the second core C2 is a specialized processor, also called DSP (Digital Signal Processor) and dedicated to a specific digital signal processing, such as an audio signal processing or a video decoding, or else a communication channel coding. Therefore, the first C1 and second C2 cores will be sometimes respectively called CPU and DSP hereafter.

But the invention is not limited to these types of cores. Indeed, it applies to any type of core needing to receive data from and to transmit data to another core (eventually of the same type) in a synchronized way, through a common memory.

As mentioned before, a firmware is distributed at least in part into the CPU C1 and the DSP C2. Each of them has to carry out operations or tasks which produce, once completed, data that must be transferred to the other one, at least for some of them. Each operation or task, whose data must be transferred, is associated to a flag (binary value). Moreover, each group of data to be transferred from one core Ci (i=1 or 2) to the other Ci' (i'=2 or 1) is transmitted to the memory M by the bus CBi, to which the transferring core Ci is connected, in order to be momentarily stored at a chosen location known from both cores Ci and Ci' and associated to a chosen flag.

According to the invention, the (common) memory M only stores the data that must be transferred from one core Ci to the other one Ci'.

The control device D comprises at least one flag register FRi which is coupled to the CPU C1 and the DSP C2 via their respective buses BC1 and BC2. Each flag register FRi is arranged to store the respective values of the above mentioned flags at chosen addresses. For this purpose, it comprises Ni storing areas corresponding to Ni addresses known from the CPU C1 and the DSP C2.

When a first core Ci (for instance the CPU C1) has completed a task or operation associated to a flag having a chosen address in a flag register FRi, it transmits the corresponding group of data to transfer to the memory M in order they could be stored at a chosen address thereof, and transmits a message to the flag register FRi requiring it to set the flag, associated to the transferred group of data, to 1.

A message comprises at least one octet (or word) in each of which each bit designates a flag whose value is stored into the corresponding flag register FRi. More precisely, if a word bit value is equal to 0, this means that the corresponding flag value must remain unchanged, and if a word bit value is equal to 1, this means that the corresponding flag value must be changed (from 0 to 1). For instance, when a word of 8 bits is equal to (00000001), the first flag value associated to the first word bit (equal to 1) must be set to 1, while the seven other flag values associated to the seven other word bits (equal to 0) must remain unchanged. Now, when a word of 8 bits is equal to (00010001), the first and fifth flag values associated to the first and fifth word bits (equal to 1) must be set to 1, while the six other flag values associated to the six other word bits (equal to 0) must remain unchanged.

So, when the flag register FRi, corresponding to the word contained into the message, receives this message, it changes only each flag value associated to a word bit equal to 1. In other words, it sets (to 1) each flag value associated to a word bit equal to 1. It is recall that as long as an operation or task has not been completed the corresponding flag value remains equal to 0.

The second core Ci' (for instance the DSP C2) polling the flag values stored into the flag register FRi, when it becomes aware of the change of value of a flag, it knows that the corresponding group of data is stored into the memory M at the associated address. So It can access to the memory M and proceed to the data transfer. When the data transfer has been completed, the second core Ci' transmits a message to the flag register FRi requiring it to reset the flag associated to the transferred group of data. This message comprises also at least one octet (or word) in each of which each bit designates a flag whose value is stored into the corresponding flag register FRi.

So, when the flag register FRi, corresponding to the word contained into the message, receives this message, it changes only each flag value associated to a word bit equal to 1. In other words, it resets (to 0) each flag value associated to a word bit equal to 1.

The first core Ci polling the flag values stored into the flag register FRi, when it becomes aware of the change of value of a flag, it knows that the corresponding group of data, it had previously transmitted to the memory M, has been effectively transferred to the second core Ci'.

Each flag register FRi being simultaneously accessible by the two cores C1 and C2, each flag value (stored at a first address in a flag register FRi) can be set or reset by one of the cores (for instance C1) by means of a message (or command), containing at least one word designating this first address, while in the same time at least one other flag value (stored at a second address in this flag register FRi) can be simultaneously set or reset by the other core (for instance C2) by means of a message (or command), containing at least one word designating this second address.

In the non-limiting example illustrated in FIG. 3, the control device D comprises first FR1 and second FR2 unidirectional flag registers both coupled to the first BC1 and second BC2 buses. A unidirectional flag register FRi is a register in which a first core Ci can only set flag values (relative to the operations or tasks it has to carry out) while the second core Ci' can only reset flag values (relative to the group of data it is waiting for).

In the illustrated example, the first flag register FR1 is dedicated to the operations or tasks carried out by the CPU C1, while the second flag register FR2 is dedicated to the operations or tasks carried out by the DSP C2. Therefore, the CPU C1 can set flag values to 1 into the first register FR1 and reset flag values to 0 into the second register FR2, while the DSP C2 can set flag values to 1 into the second register FR2 and reset flag values to 0 into the first register FR1.

The first flag register FR1 comprises Ni storing areas for storing the respective values of N1 flags relative to the transfer of data from the memory M to the second core C2. The second flag register FR2 comprises N2 storing areas for storing the respective values of N2 flags relative to the transfer of data from the memory M to the first core C1. For instance N1=N2=8.

In the non-limiting example illustrated in FIG. 3, the control device D comprises first FR1 and second FR2 unidirectional flag registers, but in a variant the control device D could comprise either several first unidirectional flag registers FR1 and/or several second unidirectional flag registers FR2, or at least one bi-directional flag register. In the last case (bi-directional flag register(s)), every core Ci can set or reset any flag value stored in the Ni storing areas of a flag register FR1. This requires that a same binary value 0 or 1 has two opposite meanings for the first C1 and second C2 cores (i.e. a 0 is considered as a 0 by the first core C1 but as a 1 by the second core C2).

It is important to notice that the number of (unidirectional or bi-directional) flag registers FRi depends on the number of flag values (associated to each core Ci) which must be stored. For instance, if there are less than 8 flag values to store, only one flag register is enough. Now, if there are more than 8 flag values to store, two or more flag registers must be provided for. Generally, the number of flags depends on the number of bits that a bus BCi is able to transmit.

Moreover, in the non-limiting example illustrated in FIG. 3, the control device D is independent from the memory M. But, in a variant, the memory M could be a part of the control device D, as illustrated in FIG. 4. In this case, the flag register(s) FRi may constitute one or more parts of a register R.

One will now describe, in more details and with reference to FIGS. 5 and 6, an example of embodiment of a control device D.

FIG. 5 illustrates a functional example of embodiment in which each flag register FRi comprises a first control module CM1, a second control module CM2 and a storing module SM. In FIG. 5 only the functional structure of the first flag register FR1 has been shown. But the functional structure of the second flag register FR2 is identical to the one of the first flag register FR1.

The storing module SM comprises Ni one bit storing areas (1 to Ni), having Ni respective addresses, for storing respectively the current values (0 or 1) of the Ni flags.

The first control module CM1 comprises:
a first reading and writing module RWM1 for accessing to the Ni different storing areas (1 to Ni) of the storing module SM, for reading and writing purpose. It acts as an interface for the CPU C1 and comprises the components carrying out the control logic,
a first input which is connected to the first bus BC1 (connected to the CPU C1) and to the first reading and writing module RWM1, and
Ni first outputs connected to the first reading and writing module RWM1 and to the Ni different storing areas (1 to Ni) of the storing module SM.

The first CM1 and second CM2 control modules have the same functional structure. So, the second control module CM2 comprises:
a second reading and writing module RWM2 for accessing to the Ni different storing areas (1 to Ni) of the storing module SM, for reading and writing purpose. It acts as an interface for the DSP C2 and comprises the components carrying out the control logic,
a second input which is connected to the second bus BC2 (connected to the DSP C2) and to the second reading and writing module RWM2, and
Ni second outputs connected to the second reading and writing module RWM2 and to the Ni different storing areas (1 to Ni) of the storing module SM.

Thanks to this symmetrical structure, and more precisely to the first CM1 and second CM2 control modules, each flag register FRi can be accessed simultaneously by the CPU C1 and the DSP C2, for reading (polling) and/or writing purpose.

Preferably, each of the first CM1 and second CM2 control modules can set and/or reset, approximately simultaneously, several (at least two and preferably Ni) flag values stored in several storing areas of the storing module SM, each time it receives a single command (message) designating the respective addresses of these several storing areas from the core Ci to which it is coupled. This results from the fact that each flag register FRi receives a command word of several bits.

For this purpose, the first CM1 and second CM2 control modules and the storing module SM of each flag register FRi may be divided in Ni identical and parallel parts each responsible for the process (reading and writing) of one flag value (i.e. of one bit). A non-limiting example of embodiment of one of these Ni flag register parts is illustrated in FIG. 6.

This illustrated flag register part comprises a first control sub-module CM1j (j=1 to Ni) constituting one of the Ni parts (CM11 to CM1Ni) of the first control module CM1, a second control module CM2j (j=1 to Ni) constituting one of the Ni parts (CM21 to CM2Ni) of the second control module CM2, and a storing sub-module SMj (j=1 to Ni) constituting one of the Ni parts of the storing module SM.

For instance, and as illustrated, each first control sub-module CM1j comprises a first reading and writing sub-module RWM1j comprising:
a first AND gate AG11 with a first input ("BitN write") connected to the first bus BC1 and corresponding to the j-th flag value to be written in the flag register, a second input ("write") also connected to the first bus BC1 and enabling the writing operation (a value equal to 0 means that there is no operation to do, while a value equal to 1 means that a writing operation must be carried out on the j-th flag value), and an output constituting a first sub-part of one of the Ni outputs of the first control module CM1,
a second AND gate AG12 with a first input ("clock") connected to the first bus BC1 for receiving clock cycles from a first clock (dedicated to core C1), a second input connected to the output of the first AND gate AG11, and an output constituting a second sub-part of one of the Ni outputs of the first control module CM1, and a flip-flop F1 (or "FF2") with a first input for receiving clock cycles from the first clock, a second input ("D") for receiving a j-th flag value, an output ("Q") for delivering said j-th flag value ("BitN read") into the first bus BC1.

Each second control sub-module CM2j comprises a second reading and writing sub-module RWM2j comprising:

a first AND gate AG21 with a first inverted input ("BitN write") connected to the second bus BC2 and corresponding to the j-th flag value to be written in the flag register, a second input ("write") also connected to the second bus BC2 and enabling the writing operation, and an output constituting a first sub-part of one of the Ni outputs of the second control module CM2, a second AND gate AG22 with a first input ("clock") connected to the second bus BC2 for receiving clock cycles from a second clock (dedicated to core C2), a second input connected to the output of the first AND gate AG21, and an output constituting a second sub-part of one of the Ni outputs of the second control module CM2, and a flip-flop F2 (or "FF3") with a first input for receiving clock cycles from the second clock, a second input ("D") for receiving the j-th flag value, and an output ("Q") for delivering said j-th flag value ("BitN read") into the second bus BC2.

Each storing sub-module SMj comprises:

a first OR gate OG1 with a first input connected to the output of the first AND gate AG11 of the first reading and writing sub-module RWM1j, a second inverted input connected to the output of the first AND gate AG21 of the second reading and writing sub-module RWM2j, and an output, a second OR gate OG2 with a first input connected to the output of the second AND gate AG12 of the first reading and writing sub-module RWM1j, a second input connected to the output of the second AND gate AG22 of the second reading and writing sub-module RWM2j, and an output, and a flip-flop F3 (or "FF1") with a first input ("D") connected to the output of the first OR gate OG1, a second input ("CK"—clock) connected to the output of the second OR gate OG2, and an output ("Q") for delivering said j-th flag value ("BitN read"). This flip-flop F3 stores the flag value defined by the signal outputted by the first OR gate OG1 under control of the signal outputted by the second OR gate OG2.

With such an arrangement, one can apply the following (non-limiting) example of rules for the first flag register FR1 (containing flag values relative to the transfer of data from the memory M to the second core C2):

if the first core C1 writes the value "core_C1_write_value" into the j-th storing area of the storing module SM of the first flag register FR1, the latter performs the operation "register_value=register_value|core_C1_write_value", where | is the binary operator "OR" which applies bit to bit, to compute the new register value. So, the first flag register FR1 only gives a clock cycle to the flip-flop F1 or F2 of the j-th part where "core_C1_write_value" bit is set to 1, leaving the ability to have simultaneous and asynchronous clocking of another flip-flop F2 or F1 on the other side. This means that all the flag values of the flag register FR1 written with a 0 and associated to a word bit equal to 1 are set (to 1), and all the flag values of the flag register FR1 written with a 0 or a 1 and associated to a word bit equal to 0 are left unchanged, if the second core C2 writes the value "core_C2_write_value" into the j-th storing area of the storing module SM of the first register FR1, the latter performs the operation "register_value=register_value & core_C2_write_value", where & is the binary operator "AND" which applies bit to bit, to compute the new register_value. So, the first flag register FR1 only gives a clock cycle to the flip-flop F1 or F2 where "core_C2_write_value" bit is set to 0, leaving the ability to have simultaneous and asynchronous clocking of another flip-flop F2 or F1 on the other side. This means that all the flag values of the flag register FR1 written with a 1 and associated to a word bit equal to 0 are cleared (reset to 0), and all the flag values of the flag register FR1 written with a 0 or 1 and associated to a word bit equal to 1 are left unchanged. This use inversion of the word bit values results from the fact that the first input ("BitN write") of the first AND gate AG21 is inverted.

The reciprocal rules apply for the second flag register FR2 which contains the flag values relative to the transfer of data from the memory M to the first core C1.

As the flags inside a flag register FRi are independent, hardware to allow propagation from one clock domain to the other can be reduced to minimum. Indeed, if one core (C1 or C2) sets several flags to 1 at the same time (within a single write instruction (or command)), it is not necessary to guaranty that all flags are also set within the same cycle of the clock of the other core (C2 or C1).

An example of truth table, which may be applied to the example of embodiment illustrated in FIG. 6, is given hereafter.

| Side C1 | | Side C2 | | | F3 ("FF1") | | | |
|---|---|---|---|---|---|---|---|---|
| BitN | | | BitN | | | | | |
| clock | write | write | clock | write | write | D | CK | $Q_{n+1}$ | Comments |
| ↑ | 1 | 1 | x | x | 1 | 1 | ↑ | 1 | Set flag |
| x | x | 0 | X | x | 1 | x | 0 | $Q_n$ | Do nothing |
| x | x | 0 | ↑ | 1 | 0 | 0 | ↑ | 0 | Clear flag |

This truth table shows that the first core C1 is only able to write bit values equal to 1. For instance the second line of the table, which corresponds to writing of a 0 by the first core C1 (through a bit equal to 0 in the word (command) it has transmitted), shows that the corresponding flag value remains unchanged ($Q_{n+1}=Q_n$) and that the second core C2 is only able to write flag value equal to 0.

The control device D is typically realised with hardware modules.

Thanks to the invention, the size of each storing area dedicated to the storage of the bit defining a flag value is equal to one (1) bit. So, the memory size dedicated to the storage of the flag values is strongly reduced. Moreover, the flag values being stored into flag register(s), all the storing areas of the common memory can be used for storing the data to transfer between the cores. So, it is possible either to increase the number of data that can be stored into the common memory before to be transferred, or to reduce the size of the common memory, which can freed some space for another electronic component into the integrated circuit.

The invention is not limited to the embodiments of control device, integrated circuit and electronic equipment described above, only as examples, but it encompasses all alternative embodiments which may be considered by one skilled in the art within the scope of the claims hereafter.

The invention claimed is:

1. Control device for an integrated circuit comprising at least two cores coupled, via buses, to a memory arranged to store data to be transferred between said cores, characterized in that it comprises at least one flag register coupled to said cores via said buses and arranged to store, at Ni addresses, Ni flag values associated to data stored into said memory by one of said cores and ready to be transferred towards the other one of said cores, each flag value stored at a first address being able to be set or reset by one of said cores a command designating said first address, thus authorizing another flag value stored at a second address to be simultaneously set or reset by the other core a command designating said second address.

2. Control device according to claim 1, characterized in that it comprises:
   i) at least one first flag register coupled to said buses and arranged to store, at N1 addresses, N1 flag values associated to data stored into said memory by a first one of said cores and ready to be transferred towards a second one of said cores, each flag value stored at a first address of said first register being able to be set by said first core and reset by said second core a command designating said first address, and
   ii) at least one second flag register coupled to said buses and arranged to store, at N2 addresses, N2 flag values associated to data stored into said memory by said second core and ready to be transferred towards said first core, each flag value stored at a first address of said second register being able to be set by said second core and reset by said first core by a command designating said first address.

3. Control device according to claim 1, characterized in that each flag register comprises:
   i) a first control means comprising a first input, connected to the bus which is connected to said first core, Ni first outputs, and a first flag value reading and writing means,
   ii) a second control means comprising a second input, connected to the bus which is connected to said second core, Ni second outputs, and a second flag value reading and writing means, and
   iii) a storing means comprising Ni storing areas having Ni respective addresses, arranged to store respectively Ni flag values, and connected respectively to one of said first outputs and one of said second outputs.

4. Control device according to claim 3, characterized in that each of said first and second control means is arranged to set and/or reset several flag values stored in several storing areas of said storing means when it receives a single command designating the respective addresses of said several storing areas.

5. Control device according to claim 1, characterized in that it comprises said memory.

6. Control device according to claim 5, characterized in that said memory is chosen in a group comprising at least a DRPAM memory and a RAM memory.

7. Integrated circuit for an electronic equipment, characterized in that it comprises a control device according to claim 1.

8. Electronic equipment, characterized in that it comprises an integrated circuit according to claim 7.

9. Electronic equipment according to claim 8, characterized in that it is chosen in a group comprising at least a computer, a telephone, a personal digital assistant and a music player.

* * * * *